United States Patent [19]
Gunn et al.

[11] Patent Number: 5,436,827
[45] Date of Patent: Jul. 25, 1995

[54] CONTROL INTERFACE FOR CUSTOMER REPLACEABLE FAN UNIT

[75] Inventors: Daniel D. Gunn; William P. Bunton, both of Austin, Tex.

[73] Assignee: Tandem Computers Incorporated, Cupertino, Calif.

[21] Appl. No.: 269,187

[22] Filed: Jun. 30, 1994

[51] Int. Cl.⁶ .............................................. G05B 15/00
[52] U.S. Cl. ..................... 364/187; 364/131; 364/133; 361/695
[58] Field of Search ............... 364/131, 133, 184–187, 364/141; 236/16, 49.3; 388/800–814, 830, 832, 904, 917; 318/440, 798, 806; 165/80.3; 361/695

[56] References Cited

U.S. PATENT DOCUMENTS

| | | | |
|---|---|---|---|
| 3,935,522 | 1/1976 | Tsay | 388/830 |
| 4,605,883 | 8/1986 | Cockroft | 388/814 |
| 4,651,072 | 3/1987 | Takata | 318/440 |
| 5,136,465 | 8/1992 | Benck et al. | 361/384 |
| 5,249,741 | 10/1993 | Bistline et al. | 236/49.3 |
| 5,325,286 | 6/1994 | Weng et al. | 364/141 |

OTHER PUBLICATIONS

*Variable Air Cooling for Computer and/or Electronic Equipment*, IBM Technical Disclosure Bulletin, vol. 32, No. 10A, Mar. 1990.

*Primary Examiner*—James P. Trammell
*Attorney, Agent, or Firm*—Townsend and Townsend Khourie and Crew

[57] ABSTRACT

A fault-tolerant control and monitoring system for fan assemblies used in electronic equipment. The fan control and monitoring system of the present invention reduces the probability of high temperature damage due to power failure by using a power mixing circuit that provides redundant power to the fans. The system includes means for detecting faults in the power mixing circuit. The system of the present invention further includes means for measuring the exact speed of the fans, as well as means for finer control of fan speed. Physical presence of fan unit is detected without additional pin requirements.

10 Claims, 2 Drawing Sheets

CONTROL INTERFACE FOR CUSTOMER REPLACEABLE FAN UNIT

BACKGROUND OF THE INVENTION

The present invention relates in general to fan assemblies that provide forced-air cooling in computer systems, and in particular to a fault-tolerant control and monitoring system for such fan assembly.

Most electronic equipment generate heat under normal operating conditions. Cooling systems are provided in those electronic systems where the generated heat may cause damage to the system components. Large computer systems and disc drive circuits are examples of equipment wherein provisions are made for forced-air cooling. A computer system typically includes one or more fan assemblies that provide for ventilation and cooling. Today's computer systems use fans with variable speed to reduce acoustic noise and increase power efficiency. The speed and functionality of the fan units must be monitored and controlled at all times to avoid damage to system components caused by high temperatures.

A common problem associated with fan control systems arises from any failure in the supply of power to the fan unit. Fan control systems must be designed to reduce the probability of such power failure and to detect it as soon as it occurs. Another drawback of some existing fan control systems is their inability to measure the exact speed of the fans. In these systems, a signal generated by a Hall-effect device inside the fan is first frequency-to-voltage converted, and then compared to two or more threshold voltages. Such systems are, therefore, capable of measuring the speed of each fan only within a range defined by the threshold voltages. Another associated drawback is the degree of control over the fan speed. Some existing fan control systems are capable of adjusting the fan speed at only two or three settings. In such systems, a dual fan assembly is commonly utilized such that when the speed of one of the fans drops below a certain threshold, the speed of the other fan is increased to compensate for the first fan.

Other functions that must be performed by fan control systems is physical presence detection. That is, the system must be capable of signaling the physical presence or absence of a fan unit. Finally, the control system itself must provide for fault detection mechanisms.

Thus, there exists a need for an improved fault-tolerant fan control and monitoring systems for use in electronic equipment.

SUMMARY OF THE INVENTION

The present invention provides a fault-tolerant control and monitoring system for fan assemblies used in computer systems. The fan control and monitoring system of the present invention reduces the probability of high temperature damage due to power failure by using a power mixing circuit that provides redundant power to the fans. The system includes means for detecting faults in the power mixing circuit. The system of the present invention further includes means for measuring the exact speed of the fans, as well as means for finer control of fan speed. Physical presence of fan unit is detected without additional pin requirements.

Accordingly, in one embodiment, the present invention provides a fan control and monitoring system including: a power mixing circuit having a first and a second input for receipt of a first and a second power rail, respectively, a first pair of power rail enable inputs and a second pair of power rail enable inputs, a first pair of power rail status outputs and a second pair of power rail status outputs, and a power output. The system further includes a fan unit having a power input coupled to the power output of the power mixing circuit, a speed control input and a speed indicator output, as well as a first control board having a fan speed indicator input coupled to the speed indicator output of the fan unit, a pair of power rail status inputs coupled to the first pair of power rail status outputs of the power mixing circuit, respectively, a pair of power rail enable outputs coupled to the first pair of power rail enable inputs of the power mixing circuit, respectively, and a speed control output coupled to the speed control input of the fan unit, and a second control board having a fan speed indicator input coupled to the speed indicator output of the fan unit, a pair of power rail status inputs coupled to the second pair of power rail status outputs of the power mixing circuit, respectively, a pair of power rail enable outputs coupled to the second pair of power rail enable inputs of the power mixing circuit, respectively, and a speed control output coupled to the speed control input of the fan unit.

The power rail status signals are generated by a special circuitry inside the power mixing circuit and indicate when one of the power rails is malfunctioning. By controlling the power rail enable signals, the processor alternates the source of power to the fan unit between the first and the second power rails to ensure functionality at all times. The processor also receives the speed indicator signal from the fan unit and directly measures the exact rotation frequency of the fan. The processor supplies a pulse width modulated signal to the speed control input of the fan unit to adjust the speed of the fan.

A better understanding of the nature and advantages of the fault-tolerant fan control and monitoring system may be had with reference to the diagrams and detailed description below.

DESCRIPTION OF THE PREFERRED EMBODIMENT

Figure 1:
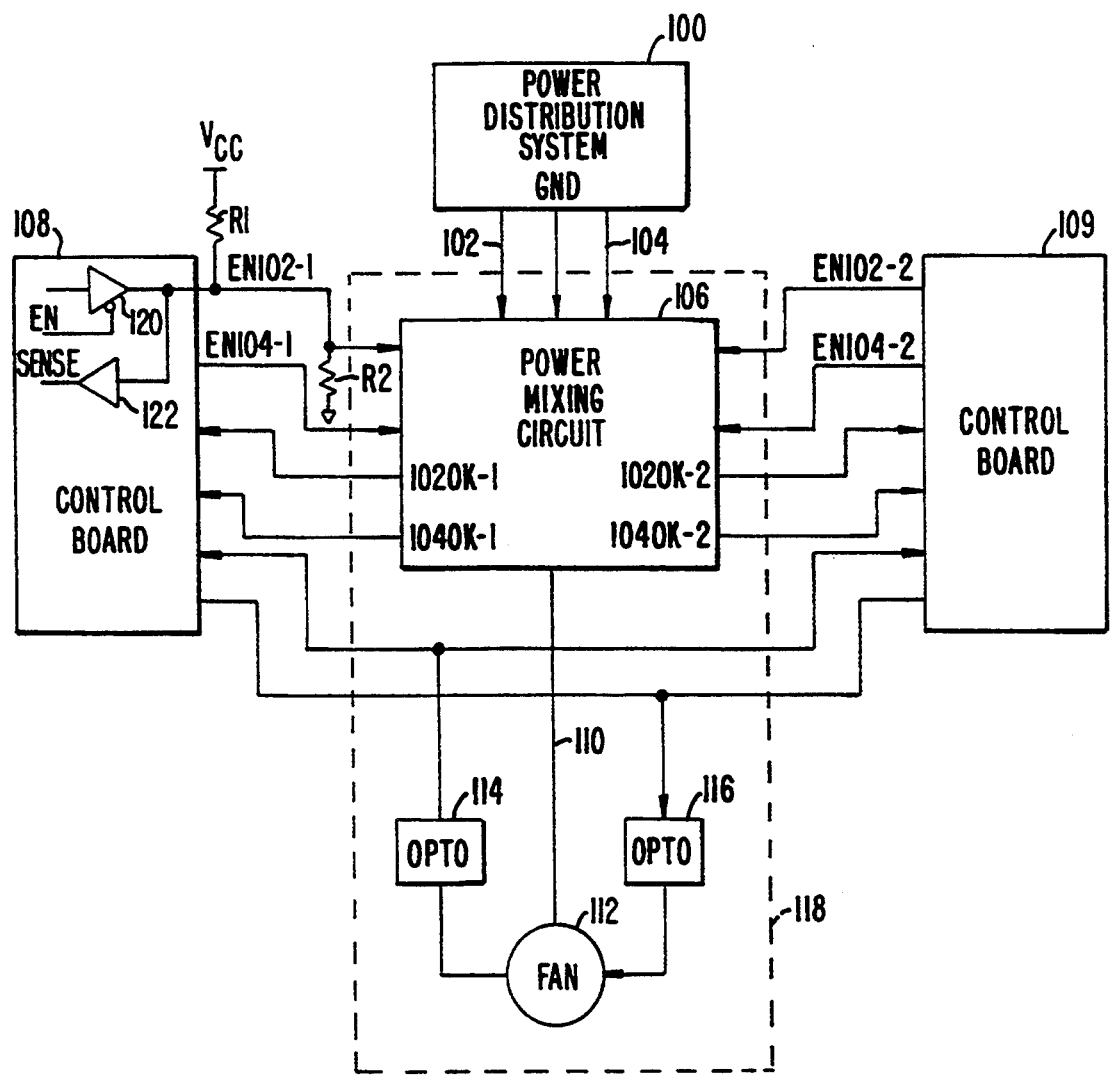
FIG. 1 is a block diagram of the fan control and monitoring system of the present invention.

FIG. 1 is a block diagram of the fault-tolerant fan control and monitoring system of the present invention. The system includes a power distribution system (PDS) 100 that supplies to the rest of the system two separate power rails 102 and 104, as well as the return ground. A power mixing circuit 106 receives the power rails 102, 104 and the return ground, and generates power rail status signals 102OK-1, 104OK-1, 102OK-2 and 104OK-2. A first control board 108 supplies rail enable signals EN102-1 and EN104-1, and a second control board 109 supplies rail enable signals EN102-2 and EN104-2 to power mixing circuit 106. Control boards 108 and 109 respectively receive power rail status signals 102OK-1, 104OK-1, and 102OK-2, 104OK-2. Control boards 108 and 109 can be either a part of a single processor or two independent processors. The power output 110 of power mixing circuit 106 connects directly to the power input of a fan 112. Fan 112 also receives a speed control signal from both control boards 108 and 109, through an opto-isolator 116. Fan 112 supplies a tachometer output signal through a second opto-isolator 114 to control boards 108 and 109.

In operation, power mixing circuit 106 performs a diode-OR operation on the two power rails 102 and 104, each providing, for example, a −48 volt supply. Control boards 108 and 109 maintain the rail enable signals EN102-1, EN104-1 and EN102-2, EN104-2 active during normal operation. This turns on the power to fan 112 via power line 110. Power mixing circuit 106 includes over-current protection diodes and circuitry to detect faults in either of the power rails. The fault detection circuitry and the operation of the power mixing circuit 106 will be described in greater detail in connection with FIG. 2.

Opto-isolators 114 and 116 provide optical isolation for the fan speed signals (control and tachometer) such that these signals can be standard logic signals referenced to logic ground. The tachometer output signal is generated by a Hall-effect switch inside the fan unit, goes through opto-isolator 114, and is applied as a pulse to both control boards 108 and 109. Control boards 108 and 109 measure the frequency of the pulse to determine the exact speed of fan 112.

The fan speed is controlled by either of the control boards via their respective fan speed control lines. One of the two control boards sends a pulse width modulated signal to the fan, while the other leaves its fan speed control signal statically active. A logical AND of the two speed control signals is performed at the input of opto-isolator 116 such that both control boards must agree (statically active) for the fan to run at low speed. Thus, if either one of the control boards is inactive with the other sending either a statically active signal or a pulse width modulated signal, the fan will run at its maximum speed. Some fan units are designed with a speed control input that when pulled low causes the fan to go at low speed (e.g., half speed), and when left open the fan rotates at maximum speed. Applying a pulse width modulated signal to this input allows for finer control over the speed of the fan. The duty cycle of the pulse width modulated signal is integrated over time to generate the final rotation frequency. Thus, the actual frequency of operation of the pulse width modulation circuits in each control board is not critical. Neither is there a requirement in this scheme to synchronize the two circuits. Given a maximum fan speed of, for example, 3000 r.p.m.'s and a low speed of 1500 r.p.m.'s, a 50% duty cycle signal at the fan speed control input would result in a fan speed of 2250 r.p.m.'s.

A maintenance and control software in the processor incorporating the two control boards periodically exchanges the roles of the two control boards. That is, during a first period, control board 108 sends a pulse width modulated signal on it's speed control output, and control board 109 leaves it's speed control line statically active. During the next period, the speed control signal from control board 108 turns statically active, while the speed control output from control board 109 sends a pulse width modulated signal. Thus, failure of a fan speed control line that causes it to always be active is detected by monitoring the fan tachometer output and measuring an unexpected decrease in fan speed indicating both signals being statically active. Failure of a fan speed control line that causes it to go inactive, on the other hand, is detected by measuring an increase in the fan speed. Faults in the pulse width modulation control boards are removed by swapping roles. This ensures that both control boards are capable of driving the fan speed control lines appropriately.

Figure 2:
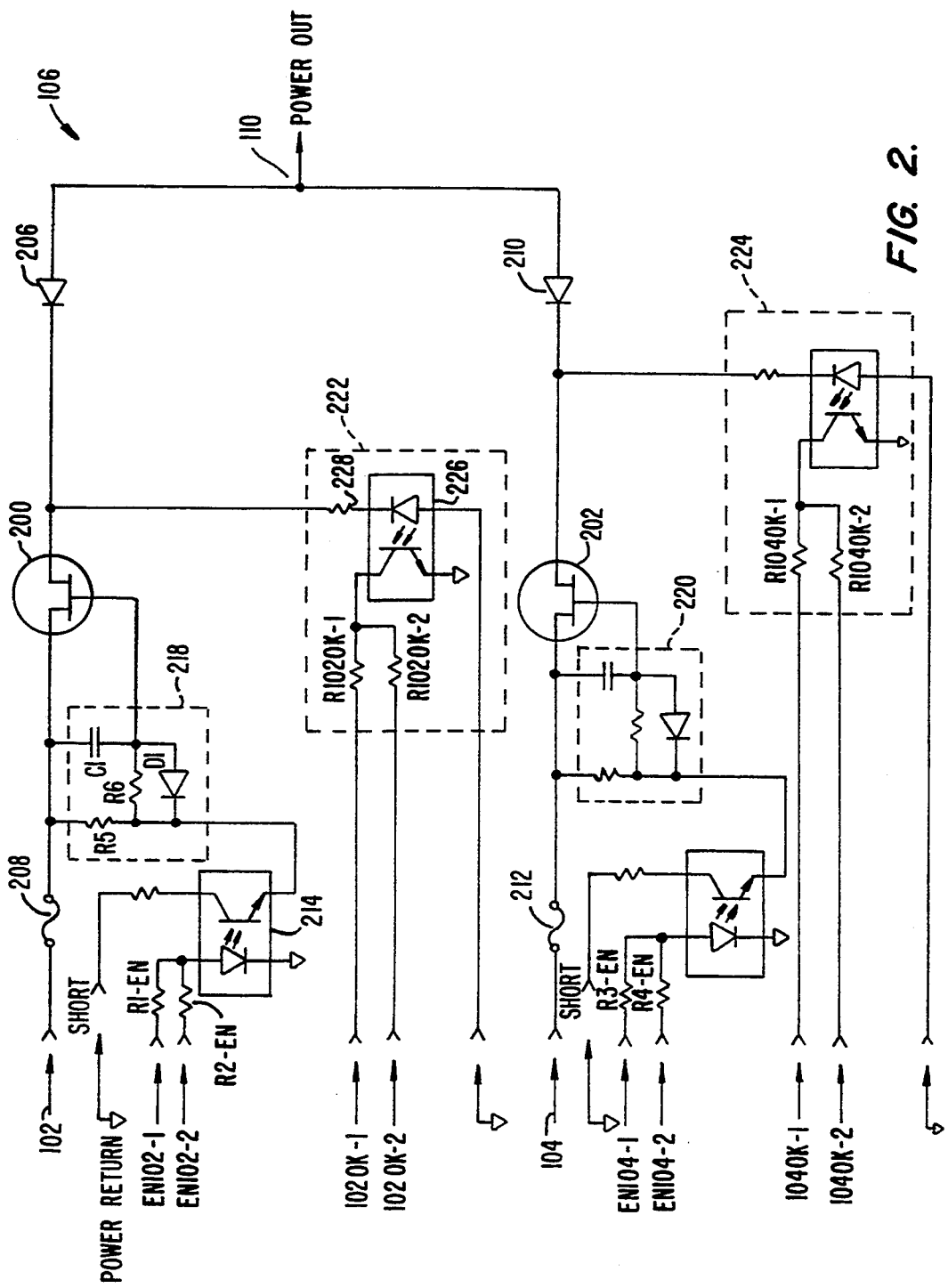
FIG. 2 is a circuit diagram of a power mixing circuit used in the fan control and monitoring system of the present invention.

The power mixing circuit 106 will be described in greater detail hereinafter. FIG. 2 shows a simplified schematic of power mixing circuit 106. Power rail 102 enters the circuit through a fuse element 208 and a power pass transistor 200, and is coupled to output 110 via an isolation diode 206. Similarly, power rail 104 enters the circuit through a fuse element 212 and a power pass transistor 202, and is coupled to output 110 via an isolation diode 210. Rail enable signals EN102-1 and EN102-2 are logically ORed by resistors R1-EN and R2-EN, and applied to an input of an opto-isolator 214. Similarly, rail enable signals EN104-1 and EN104-2 are logically ORed by resistors R3-EN and R4-EN, and applied to an input of another opto-isolator 214. The opto-isolators convert the power return signal to logical ground to allow the circuit to receive enable signals having standard logic levels. The outputs of the two opto-isolators 214 and 216 are first applied to networks 218 and 220 respectively, and then applied to the control terminal of each of the power pass transistors 200 and 216, respectively.

The power rail status signals 102OK-1, 102OK-2 and 104OK-1, 104OK-2 are generated by power rail status circuits 222 and 224, respectively. Power rail status circuit 222 includes an opto-isolator 226 that taps into power rail 102 at the input of isolation diode 206, via a resistor 228. The output of opto-isolator 222 provides status signals 102OK-1 and 102OK-2 via isolation resistors R102OK-1 and R102OK-2. Power rail status circuit 224 for rail 104 is identical to circuit 222.

The operation of power mixing circuit 106 will now be described. In the example shown in FIG. 2, the power mixing circuit is designed to operate with negative voltages (e.g. −48 volts) at power rails 102 and 104. The two power rails 102 and 104 share a common reference and return path labeled as POWER RETURN. All potentials are therefore negative with respect to this reference (e.g. −48 volt return). The power rail enable signals are supplied by control boards 108 and 109 (FIG. 1) and must have enough high-level drive current to power an opto-isolators (214 or 216). Under normal operating conditions, all four power rail enable signals are high. Current thus flows through the signal input of the corresponding opto-isolator, pulling low the output of that opto-isolator. This causes the power pass transistors to turn on and connect power rails to isolation diodes 206 and 210. Isolation diodes 206 and 210 combine the switched rails to provide power output 110 that drives the power input of fan 112. Since the circuit is supplied with two separate power sources, power will be available at power output 110 even in the event of a single fault anywhere in the system. Power pass transistors 200 and 202 provide both inrush limiting functions and power rail switching functions. Fuse elements 208 and 210 provide over-current protection, while diodes 206 and 210 provide isolation between the power rails.

Rail status circuits 222 and 224 allow detection of latent faults in the power control and rail sharing diodes 206 and 210. To test the rail sharing diodes and fuses, only one of the power rail inputs, for example 102, is enabled by asserting an enable signal, and the other power rail input is disabled. With diode 206 carrying power and power pass transistor 202 off, isolation diode 210 must be reverse biased and not conducting. If isolation diode 210 is operating properly (i.e., not short circuited), then no current is allowed to flow through the opto-isolator of status circuit 224. Thus, rail status signals 104OK-1 and 104OK-2 should remain at a logic high level, indicating no power. However, if diode 210 is faulty and causes a short circuit between the two rails, then current will flow through status circuit 224, bringing signals 104OK-1 and 104OK-2 down to a logic low level. A logic low level at 104OK-1 and 104OK-2 which indicates power rail 104 being on, when EN104-1 and EN104-2 signals are not asserted, signals a faulty isolation diode. Open circuits can be tested for by disabling one of the power rails and enabling the other, and then monitoring the fan speed. An unexpected slowing down of the fan indicates a loss of input power from the enabled power rail.

Fans are typically assembled as customer replaceable units. For example, in FIG. 1, block 118 which incorporates power mixing circuit 106, opto-isolators 114, 116, and fan 112, may be assembled into a single customer replaceable fan unit. Thus, the system must provide for protection against disruptive insertion/extraction of the unit when power is connected. The power mixing circuit of FIG. 2 shows printed circuit board type edge-connector pins for all inputs and outputs. As shown in FIG. 2, the POWER RETURN pins are made physically shorter to connect last during insertion and disconnect first during extraction of the unit. Because the power pass transistors obtain their turn-on drive through a short pin, the main power paths cannot be turned on and thus no current starts to flow until after the customer replaceable unit is seated within the system cabinet. Further protection for the circuit is provided by networks 218 and 220. When the unit is first inserted, resistor R6 and capacitor C1 provide for a long time constant to slow down the increase in voltage at the gate of power pass transistor 200. This causes the drain current of power pass transistor 200 to slowly increase to its steady state value with no overshoot. When the unit is extracted from the system, the gate voltage of power pass transistor 200 quickly discharges through diode D1 and resistor R5. The power pass transistor thus turns off shortly after the short pin disconnects but before any other connection breaks.

Customer replaceability of the fan assembly also requires provisions for detecting the physical presence or absence of a fan unit. Fan control systems typically provide for a separate physical presence status pin with a logical high or low indicating the presence or absence of a customer replaceable fan unit. The system of the present invention, however, eliminates the need for an extra pin by sharing this function with one of the control signals. For example, FIG. 1 shows one of the power enable outputs of control board 108 being driven by a tristatable driver 120. Driver 120 includes an active low enable input for tristating the output of driver 120 when pulled low. A pull-up resistor R1 connects the output node to the logical power supply Vcc. The output node also connects to an input of a buffer 122 whose output provides the sense signal for physical presence test. On the customer replaceable fan unit 118, a pull-down resistor R2 connects the rail enable input line to logical ground. The value of pull-down resistor R2 is selected to be much smaller than that of pull-up resistor R1. When the rail enable signal is inactive, control board 108 tristates driver 120 using the enable signal. If the customer replaceable fan unit 118 is present, then resistor R2 pulls the output node down to a logic low level. Control board 108 can thus sense the physical presence of the customer replaceable fan unit 118 by looking for a low logic level on the sense output. If the unit is not present, resistor R1 pulls the output node up to a logic high level resulting in a high logic level at the sense output. When not tristated, driver 120 overrides the effects of the resistors by actively driving the rail enable signal to the output node. Note that selection of the resistor values R1 and R2 as well as the corresponding resistor at the enable input to opto-isolator 214 (FIG. 2) must allow driver 120 to turn on the opto-isolator to perform the power rail switching function, but prevent turning on the power rail switching function when driver 120 is disabled. Also, the resistor values must be selected to ensure that a failure of R2 which makes it appear as an open circuit, does not turn on the power rail switching function. This can be accomplished by choosing the appropriate value for R1 to limit the current to a level that prevents turning on the opto-isolator. As further protection, R1 and R2 act as a voltage divider to produce a logic low voltage at the input of the sense buffer 122. This low voltage is chosen to be lower than the turn on voltage of the opto-isolator. Exemplary values for R1, R2, and the resistor at the enable input might be approximately 1 MegOhm, 10 KOhms, and 470 Ohms, respectively.

In conclusion, the present invention provides a fault-tolerant control and monitoring system for fan assemblies used in electronic equipment. The fan control and monitoring system of the present invention reduces the probability of high temperature damage due to power failure by using a power mixing circuit that provides redundant power to the fans. The system includes means for detecting faults in the power mixing circuit. The system of the present invention further includes means for measuring the exact speed of the fans, as well as means for finer control of fan speed. Physical presence of fan unit is detected without additional pin requirements. While the above is a complete description of the preferred embodiment of the present invention, it is possible to use various alternatives, modifications and equivalents. For example, the power mixing circuit of the present invention has been described as using negative voltages (e.g. −48 volts). By reversing the polarity of some of the circuit components, a very similar circuit based on the basic principles of the present invention can be used in a system having positive power supply voltages. Therefore, the scope of the present invention should be determined not with reference to the above description but should, instead, be determined with reference to the appended claims, along with their full scope of equivalents.

What is claimed is:

1. A fan monitoring and control system comprising:
a power mixing circuit having a first and a second input for receipt of a first and a second power rail, respectively, a first pair of power rail enable inputs and a second pair of power rail enable inputs, a first pair of power rail status outputs and a second pair of power rail status outputs, and a power output;
a fan unit having a power input coupled to the power output of the power mixing circuit, a speed control input and a speed indicator output;
a first control board having a fan speed indicator input coupled to the speed indicator output of the fan unit, a pair of power rail status inputs coupled to the first pair of power rail status outputs of the power mixing circuit, respectively, a pair of power rail enable outputs coupled to the first pair of power rail enable inputs of the power mixing circuit, respectively, and a speed control output coupled to the speed control input of the fan unit; and a second control board having a fan speed indicator input coupled to the speed indicator output of the fan unit, a pair of power rail status inputs coupled to the second pair of power rail status outputs of the power mixing circuit, respectively, a pair of power rail enable outputs coupled to the second pair of power rail enable inputs of the power mixing circuit, respectively, and a speed control output coupled to the speed control input of the fan unit.

2. The fan monitoring and control system of claim 1 wherein the first and second control boards supply a pulse width modulated signal on the fan speed control output.

3. The fan monitoring and control system of claim 1 wherein the fan unit comprises a means for generating a digital signal representing the speed of the fan, the digital signal being supplied on the speed indicator output of the fan unit.

4. The fan monitoring and control system of claim 3 wherein the first and second control boards each further comprise a means for measuring a frequency of the digital signal to calculate an exact speed of the fan unit.

5. The fan monitoring and control system of claim 1 wherein the power mixing circuit comprises means for switching between the first and the second power rails, and means for combining the first and the second power rails.

6. The fan monitoring and control system of claim 5 wherein the means for switching comprises:

a first opto-isolator having an input coupled to the first pair of power rail enable inputs via a first pair of resistors, respectively;

a first pass transistor having a first terminal coupled to the first power rail and a control terminal coupled to an output of the first opto-isolator;

a second opto-isolator having an input coupled to the second pair of power rail enable inputs via a second pair of resistors, respectively; and a second pass transistor having a first terminal coupled to the second power rail and a control terminal coupled to an output of the second opto-isolator.

7. The power monitoring and control system of claim 6 wherein the means for combining comprises:

a first isolation diode having a first terminal coupled to a second terminal of the first pass transistor, and a second terminal coupled to the power output; and a second isolation diode having a first terminal coupled to a second terminal of the second pass transistor, and a second terminal coupled to the power output.

8. The fan monitoring and control system of claim 6 wherein the first power rail couples to the first terminal of the first pass transistor via a first fuse element, and the second power rail couples to the first terminal of the second pass transistor via a second fuse element.

9. The fan monitoring and control system of claim 5 wherein the power mixing circuit further comprises means for detecting the status of the first and second power rail.

10. The fan monitoring and control system of claim 9 wherein the means for detecting the status of the first and second power rail comprises:

a first opto-isolator having an input coupled to an output of the means for switching, and an output coupled to the first pair of power rail status outputs via a first pair of resistors, respectively; and a second opto-isolator having an input coupled to the output of the means for switching, and an output coupled to the second pair of power rail status outputs via a second pair of resistors, respectively.

* * * * *